United States Patent [19]
Milburn et al.

[11] 3,762,996
[45] Oct. 2, 1973

[54] NUCLEAR REACTOR FUEL ELEMENT ASSEMBLY
[75] Inventors: George Milburn; John Chetter, both of Lytham-St.-Annes, England
[73] Assignee: United Kingdom Atomic Energy Authority, London, England
[22] Filed: Mar. 25, 1971
[21] Appl. No.: 127,933

[30] Foreign Application Priority Data
Apr. 8, 1970    Great Britain.................. 16,802/70

[52] U.S. Cl. ............................................. 176/78
[51] Int. Cl............................................. G21c 3/34
[58] Field of Search................................ 176/76, 78

[56] References Cited
UNITED STATES PATENTS
3,510,397    5/1970    Zettervall............................ 176/78
3,377,254    9/1970    Frisch .................................. 176/78
3,182,003    5/1965    Thorp et al. ......................... 176/78

Primary Examiner—Reuben Epstein
Attorney—Larson, Taylor & Hinds

[57] ABSTRACT

A spacer grid for a nuclear reactor fuel element assembly in which a number of fuel pins are supported in a bundle with their longitudinal axes parallel and spaced transversely one from another. The grid structure is of cellular form being made up of cojoined tubular ferrules or intersecting strips defining cells each one of which is penetrated by a fuel pin. Resilient leaf members extend longitudinally in the cells of the grid structure and contact the fuel pins. The back faces of the free ends of the leaf members overlie but are spaced by a small clearance from stop members projecting inside the cells of the grid structure. The resilient leaf members are of low spring rating so as to allow freedom of lateral vibraton of the fuel pin within the cells of the grid structure whilst remaining in contact with the fuel pins. The limits of lateral vibration of the fuel pins is governed by tapping of the back faces of the resilient leaf members on the stop members.

10 Claims, 13 Drawing Figures

NUCLEAR REACTOR FUEL ELEMENT ASSEMBLY

BACKGROUND OF THE INVENTION

This invention relates to nuclear reactor fuel element assemblies and in particular to that kind of fuel element assembly including a plurality of elongate fuel pins supported in a bundle with their longitudinal axes parallel. Such a fuel element assembly employs one or more spacer grids disposed intermediate the ends of the assembly and serving to retain the correct lateral location of the fuel pins in the assembly relative to one another.

There are two known types of spacer grid. In the one type lateral movements of the fuel pins are resisted by the application of spring forces on the fuel pins by spring members in the grid acting laterally on the fuel pins. The restraint of the fuel pins may be wholly by spring members acting at points circumferentially spaced around the fuel pins. Alternatively spring members may be provided to hold the fuel pins against opposed rigid stop members in the grid. In the other type of spacer grid rigid stop means are provided at circumferentially spaced points around each fuel pin, there being a clearance between the rigid stops and the fuel pins so that the fuel pins can float or vibrate laterally to a limited degree between the rigid stops. Wear of the fuel pins due to fretting or tapping of the fuel pins against the rigid stops is accommodated by the provision of wear surfaces, such as pads on the fuel pins at the positions at which the fuel pins contact the rigid stops.

SUMMARY OF THE INVENTION

According to the present invention a spacer grid for a nuclear reactor fuel element assembly of the hereinbefore specified kind comprises a grid structure of cellular form, the cells of the grid structure in the fuel assembly each being penetrated by a fuel pin, resilient leaf members extending from the grid structure in each of the cells and contacting the fuel pins, said resilient leaf members having fretting parts facing and spaced by a small clearance from adjacent regions of the cell walls, said resilient leaf members being of low rating so as to allow freedom of lateral vibration of the fuel pins within the cells of the grid structure whilst remaining in contact with the fuel pins, the limits of lateral vibration of the fuel pins within the cells of the grid structure being defined by the clearance between the fretting parts of the resilient leaf members and the adjacent regions of the cell walls, tapping occurring between the fretting parts of the resilient leaf members and the adjacent regions of the cell walls at the limits of lateral vibration of the fuel pins.

A particular form of spacer grid in accordance with the invention comprises a grid structure of cellular form the cells of the grid structure each being penetrated by a fuel pin of the fuel element assembly, stop means being defined in the cells of the grid structure, resilient leaf members extending from the grid structure in each of the cells and contacting the fuel pins, said resilient leaf members having fretting parts overlying and being spaced by a small clearance from the stop means, the resilient leaf members being of low rating so as to allow freedom of lateral vibration of the fuel pins within the cells whilst remaining in contact with the fuel pins, the limits of lateral vibration of the fuel pins within the cells of the grid structure being defined by the clearance between the fretting parts of the resilient leaf members and the stop means, tapping occurring between the fretting parts of the resilient leaf members and the stop means at the limits of lateral vibration of the fuel pins.

The resilient leaf members may extend longitudinally in the grid structure with respect to the fuel pins, the resilient leaf members being joined with the grid structure at one end and contacting the fuel pin which extends through the corresponding cell at their other end, the back faces of the ends of the resilient leaf members which contact the fuel pins overlying and being spaced by a small clearance from stop means projecting from the grid structure inside the cell.

DESCRIPTION OF THE DRAWINGS

Embodiments of the invention will now be described by way of example with reference to the accompanying drawings in which.

DESCRIPTION OF THE PREFERRED EMBODIMENTS

Figure 1:
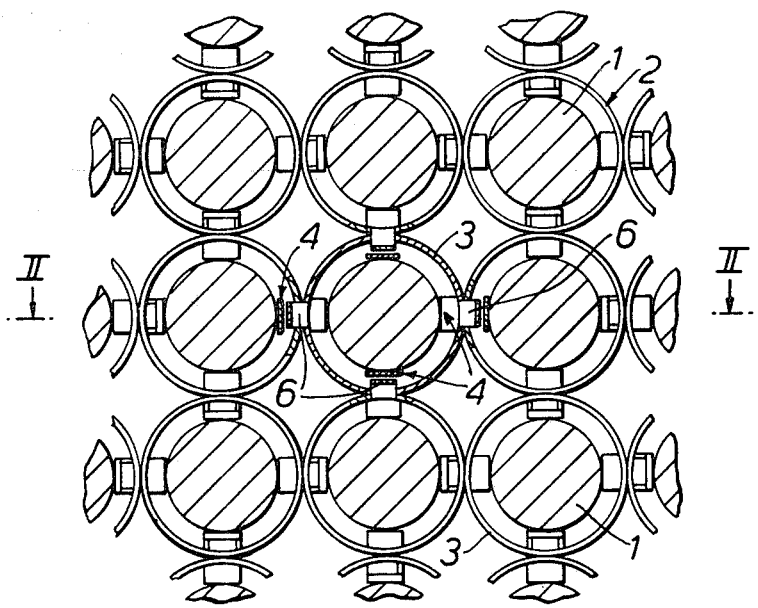
FIG. 1 is a plan view partly in section of one form of spacer grid in accordance with the invention.
Figure 2:
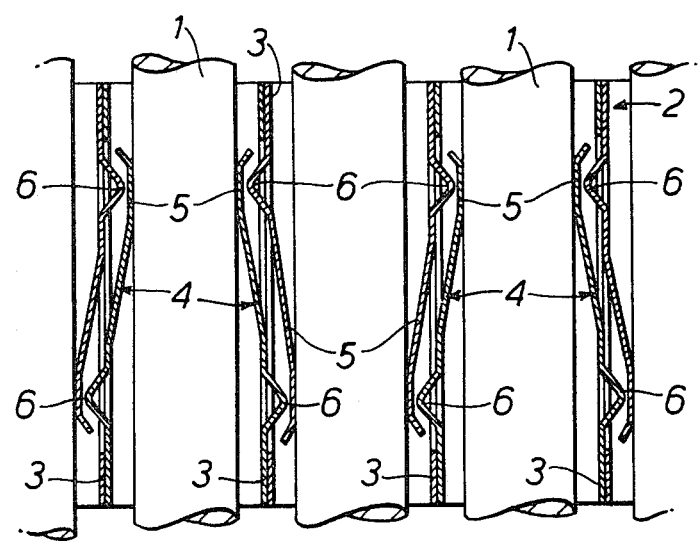
FIG. 2 is a longitudinal section along the line II—II in FIG. 1.

FIGS. 1 and 2 show part of a nuclear reactor fuel element assembly comprising a plurality of cylindrical fuel pins 1 arranged with their longitudinal axes parallel. The fuel pins 1 are spaced apart and located at points intermediate their ends by transverse spacer grids 2, one of which is shown in FIGS. 1 and 2. The spacer grid 2 comprises a grid structure formed from cojoined tubular ferrules 3. The ferrules 3 are joined, for example, by brazing. The grid structure may typically comprise 36 ferrules three arranged in a 6 × 6 or any square lattice within an outer peripheral band (not shown) which locates in an outer casing or wrapper containing the assembly of fuel pins 1.

Figure 3:
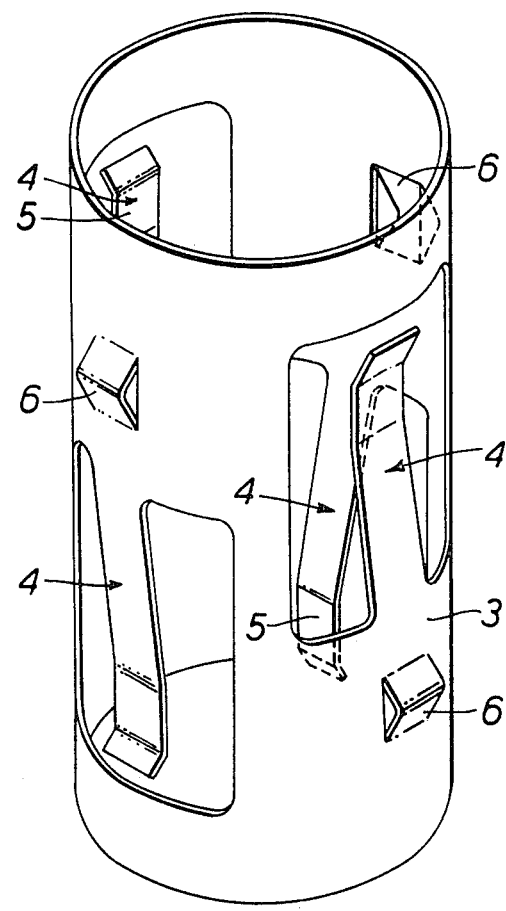
FIG. 3 is a detail of the spacer grid of FIG. 1 in isometric form.

As shown in FIG. 3 each ferrule 3 is slotted and shaped to form four longitudinally extending resilient leaf members 4. The leaf members 4 are arranged in two pairs, the leaf members 4 in each pair being on diametrically opposite sides of the ferrule 3, one of the pairs of leaf members 4 being set at 90° to and extending in the opposite direction to the other pair of leaf members 4. The leaf members 4 are bent to extend inwards into the ferrule 3 and the end of each leaf member 4 is formed with a fuel pin engaging surface 5. Four outwardly extending rigid dimples 6 are formed on each ferrule 3 one of the dimples 6 being situated at the base of each of the leaf members 4.

As can be seen in FIG. 2 the ends of the leaf member 4 in each ferrule 3 overlie and are spaced by a small clearance from the rigid dimples 6 of adjacent ferrules 3. In the fuel element assembly each of the fuel pins 1 passes through one of the ferrules 3 in the spacer grid 2 and is lightly engaged in the ferrule 3 by the four leaf members 4.

In use of the fuel element assembly the pins 1 are free to vibrate laterally in the spacer grid 2 between limits defined by the clearance between the rigid dimples 6 and the back faces of the overlying ends of the leaf members 4.

The leaf members 4 are of low rating having only sufficient resilience to overcome their own inertial forces so as to remain in contact with the fuel pins 1 as they vibrate. By this means tapping fretting of the sheaths of the fuel pins 1 on the rigid dimples 6 is avoided, tapping fretting occurs instead on the overlying back faces of the leaf members 4.

Figure 4:
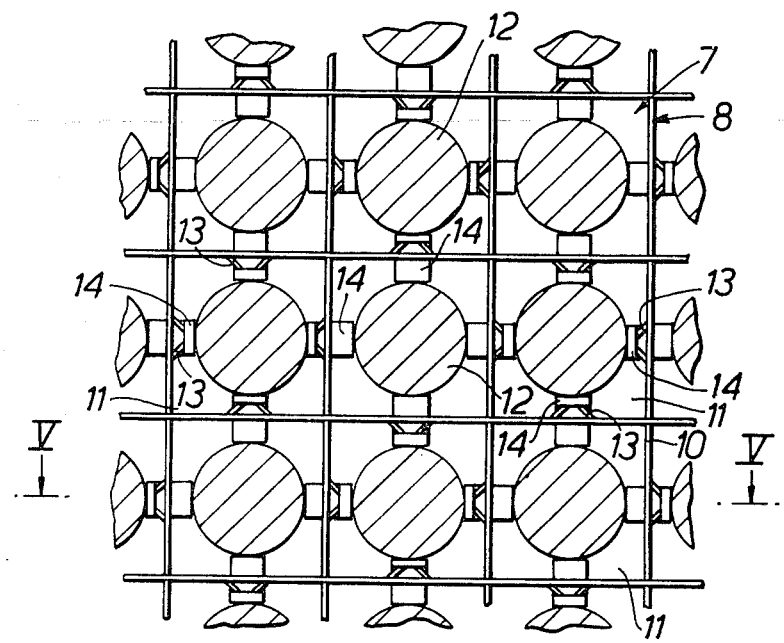
FIG. 4 is a plan view of a second form of spacer grid in accordance with the invention.
Figure 5:
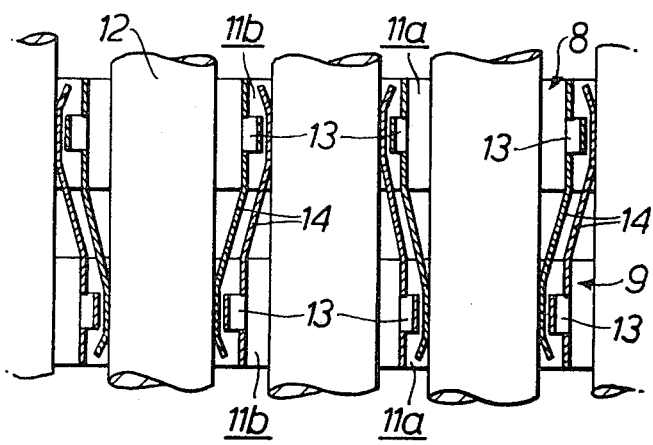
FIG. 5 is a longitudinal section along the line V—V in FIG. 4.
Figure 6:
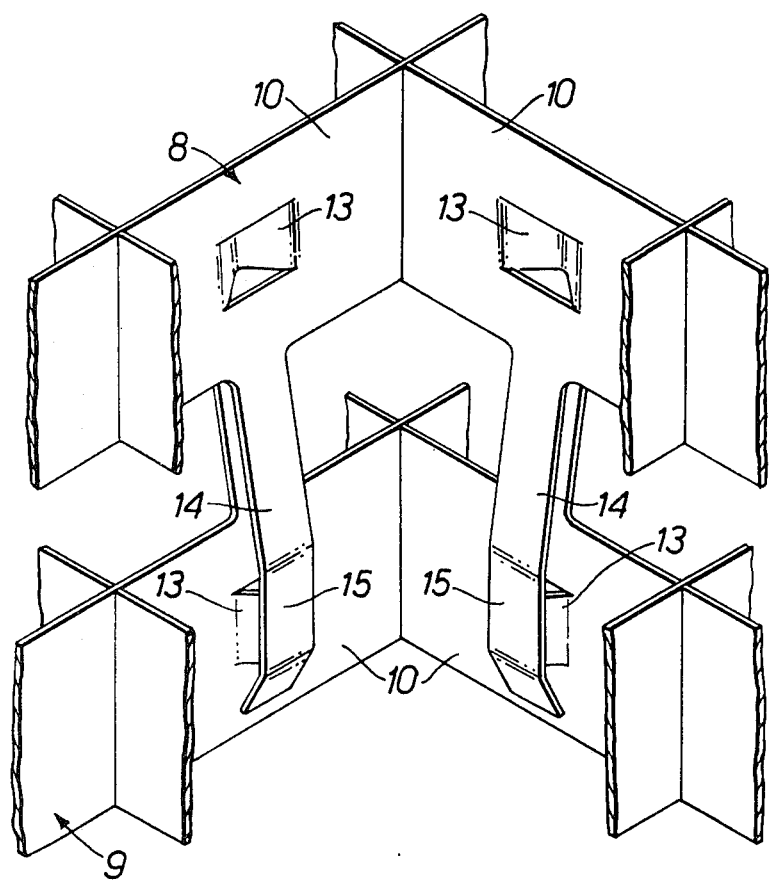
FIG. 6 is a detail of the spacer grid of FIG. 4 in isometric form.

FIGS. 4, 5 and 6 show an alternative form of spacer grid 7 comprising cojoined upper and lower egg box type grid structures 8 and 9. The grid structures 8 and 9 are formed from interlocking strips 10 defining rectangular cells 11 the strips 10 being welded or brazed together. The fuel pins 12 of a fuel element assembly each pass through corresponding cells 11 in the upper and lower grid structures 8 and 9. Rigid dimples 13 are formed in the strips 10 of each of the grid structures 8 and 9. In the upper grid structure 8, resilient leaf members 14 extend downwards from the lower edges of the strips 10 and in the lower grid structure 9, resilient leaf members 14 extend upwards from the upper edges of the strips 10.

Referring to FIG. 5 and considering the right hand cell referenced 11a in the lower grid structure 9, four rigid dimples 13 extend inwards into this cell 11a, one from each face of the cell 11a. Four members 14 extend downwards from the edges of the corresponding right hand cell 11a of the upper grid structure 8. The four leaf members 14 are bent inwards so that their lower ends overlie and are spaced by a small clearance from the rigid dimples 13 in the cell 11a of the lower grid structure 9.

In the centre cell referenced 11b which is adjacent to the right hand cell 11a in the upper grid structure 8 four rigid dimples 13 extend inwards into this cell 11b one from each face of the cell 11b. Four leaf members 14 extend upwards from the upper edges of the centre cell 11b in the lower grid structure 9. The four leaf members 14 are bent inwards so that their upper ends overlie and are spaced by a small clearance from the rigid dimples 13 in the centre cell 11b of the upper grid structure 8.

The arrangement of dimples 13 and downwardly extending leaf members 14 in the corresponding pairs of cells referenced 11a in the upper and lower grid structure 8 and 9 alternates throughout the spacer grid 7 with the reverse arrangement of dimples 13 and upwardly extending leaf members 14 in the corresponding pairs of cells referenced 11b in the upper and lower grid structure 8 and 9.

As shown in FIG. 6 the ends of the leaf members 14 which overlie the dimples 13 are formed with fuel pin engaging surfaces 15.

Figure 7:
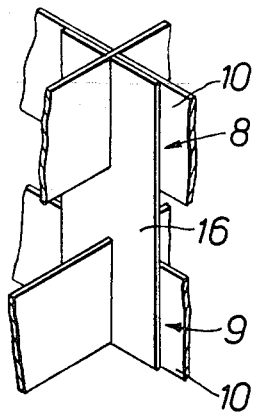
FIGS. 7, 8 and 9 are constructional details of the spacer grid of FIG. 4 also in isometric form.
Figure 8:
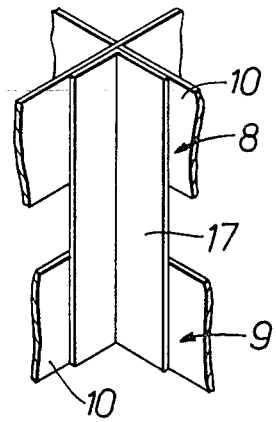

As shown in FIGS. 7 and 8, the upper and lower grid structures 8 and 9 may be joined by flat plates 16 (FIG. 7) or angle plates 17 (FIG. 8) which are welded or brazed to the strips 10 forming the grid structure 8 and 9.

Figure 9:
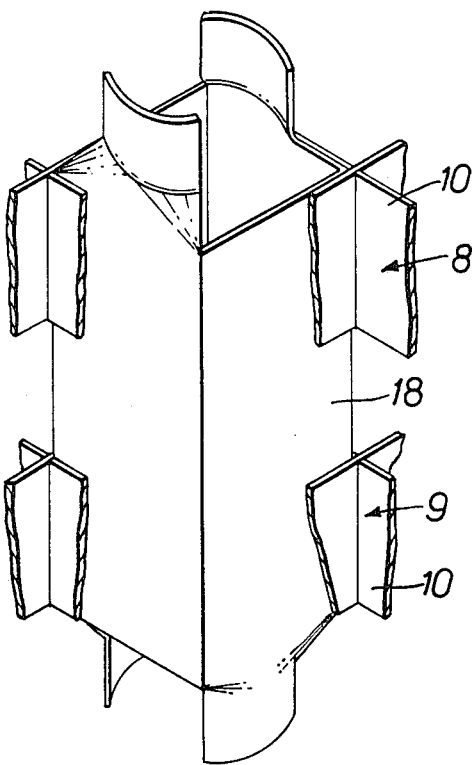

The upper and lower grid structures 8 and 9 may be joined as shown in FIG. 9, by box shaped guide ferrules 18 which are brazed or welded in the corresponding cells 11 of the upper and lower grid structures 8 and 9. The ferrules 18 may be used to space and support spacer grids 7 in a fuel assembly from either a single or a plurality of special support tubes, guide tubes or fuel pins penetrating the ferrules 18 by means of brazing, welding rivetting or other means of mechanical engagement of the ferrules 18 to the support tubes etc.

In use of a fuel element assembly having spacer grids 7 as shown in FIGS. 4, 5 and 6, the fuel pins 12 are free to vibrate laterally in the spacer grids 7 between limits defined by the clearance between the rigid dimples 13 and the four leaf members 14 which lightly engage each fuel pin 12.

In the case as in the arrangement of FIGS. 1, 2 and 3, the leaf members remain in contact with the fuel pins 12 as the fuel pins 12 vibrate and tapping fretting occurs between the back faces of the leaf members 14 and the dimples 13.

Figure 10:
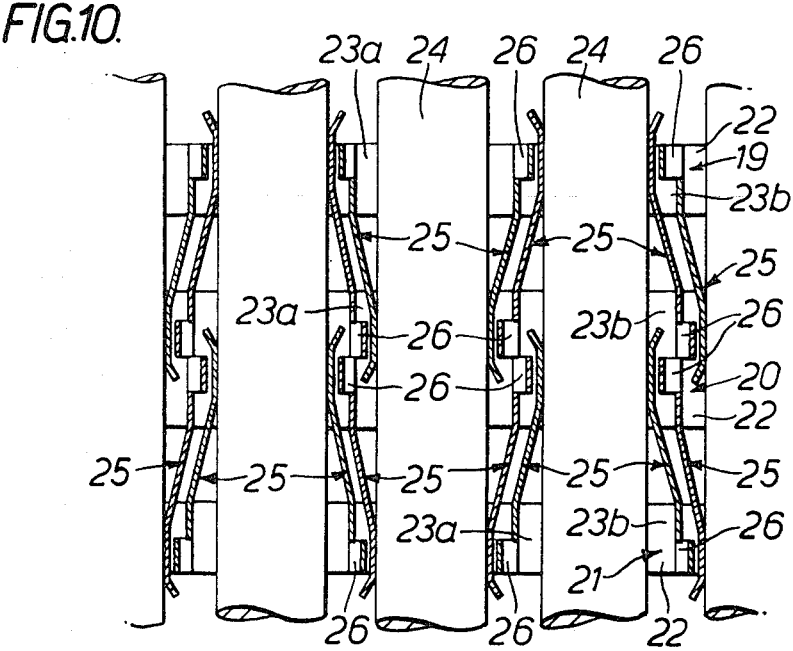
FIG. 10 is a longitudinal sectional elevation of a third form of spacer grid in accordance with the invention.
Figure 11:
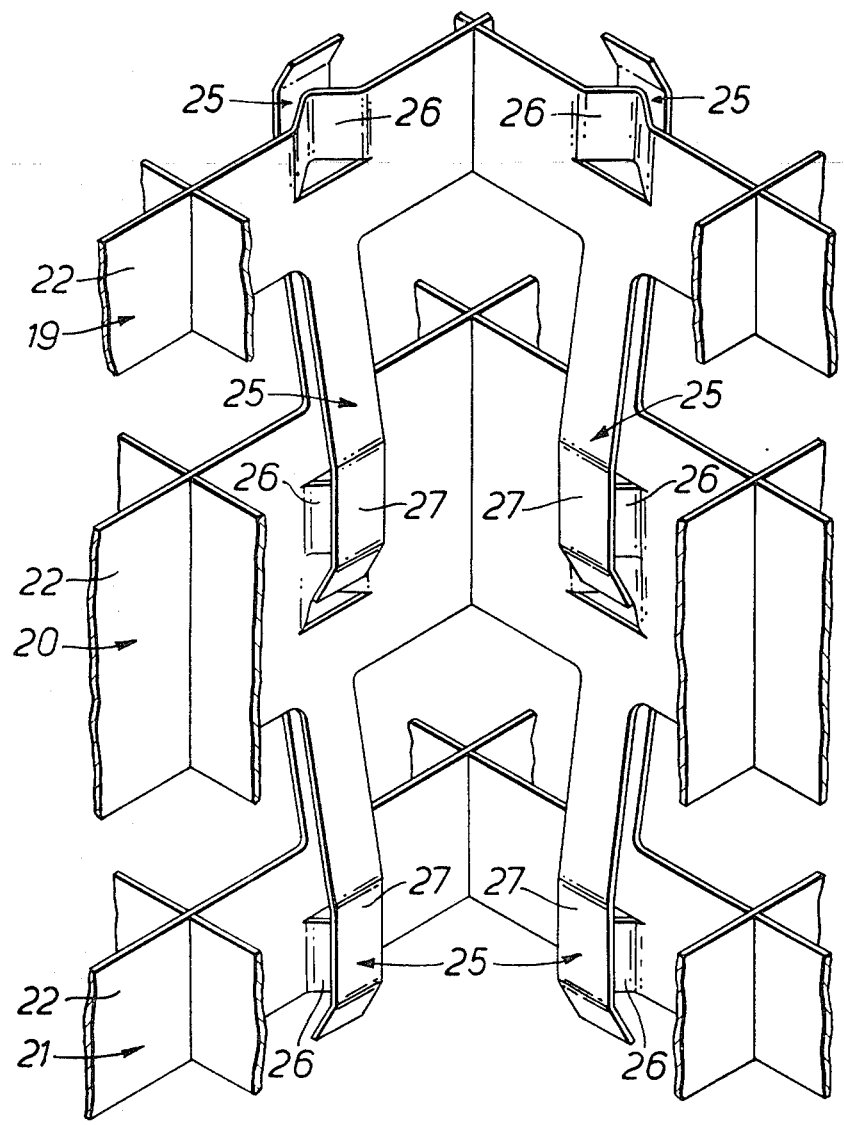
FIG. 11 is a detail of the spacer grid of FIG. 10 in isometric form.

FIGS. 10 and 11 show a third form of spacer grid comprising cojoined upper, middle, and lower egg box type grid structures 19, 20 and 21. The grid structures 19, 20 and 21 are formed from interlocking strips 22 defining rectangular cells 23. The fuel pins 24 of a fuel element assembly extend through corresponding cells 23 in the grid structures 19, 20 and 21. Each fuel pin 24 is lightly engaged by two groups of four resilient leaf members 25 which extend longitudinally from the edges of the strips 22 forming the grid structures 19, 20 and 21. The ends of the leaf members 25 overlie rigid dimples 26 formed in the strips 22 of the grid structures 19, 20 and 21.

Referring to FIG. 10 and considering the corresponding cells referenced 23a in the upper middle and lower grid structures 19, 20 and 21, four rigid dimples 26 extend into the cell 23a of the middle grid structure 20 one from each face of the cell 23a. Four leaf members 25 forming one group extend downwards from the lower edges of the corresponding cell 23a of the upper grid structure 19. The four leaf members 25 are bent inwards so that their lower ends overlie and are spaced by a small clearance from the rigid dimples 26 in the cell 23a of the middle grid structure 20. Four rigid dimples 26 extend inwards from the four sides of the corresponding cell 23a in the lower grid structure 21. Four leaf members 25 forming a second group extend downwards from the lower edges of the cell 23a in the middle grid structure and these four leaf members 25 are bent inwards so that their lower ends overlie and are spaced by a small clearance from the rigid dimples 26 in the cell 23a of the lower grid structure 21.

A reverse arrangement of leaf members 25 and rigid dimples 26 exists in the corresponding cells referenced 23b and adjacent to the cells 23a in the upper, middle and lower grid structures 19, 20 and 21. Referring to the corresponding cells 23b to the right of the cells 23a in FIG. 10 four rigid dimples 26 extend into the cell 23b of the middle grid structure 20 from the four sides of the cell 23b. Four leaf members 25, forming one group extend upwards from the upper edges of the corresponding cell 23b in the lower grid structure 21. The four leaf members 25 are bent inwards so that their upper ends overlie and are spaced by a small clearance from the rigid dimples 26 in the cell 23b of the middle grid structure. Four rigid members 26 extend inwards from the four sides of the corresponding cell 23b in the upper grid structure 19. Four leaf members 25 forming a second group extends upwards from the upper edges of the cell 23b in the middle grid structure 20 and these four leaf members 25 are bent inwards so that their upper ends overlie and are spaced by a small clearance from the rigid dimples 26 in the cell 23b of the upper grid structure 19.

The arrangement of rigid dimples 26 and downwardly extending leaf members 25 in the corresponding cells referenced 23a in the upper middle and lower grid structures 19, 20 and 21 alternates throughout the spacer grid with the reverse arrangement of rigid dimples 26, and upwardly extending leaf members 25 in the cells referenced 23b in the upper middle and lower grid structures 19, 20 and 21.

As shown in FIG. 11 the ends of the leaf members 25 which overlie the rigid dimples 26 are formed with fuel pin engaging surfaces 27.

The upper, middle and lower grid structures 19, 20 and 21 may be joined by flat or angle plates or by guide tube ferrules similar to those shown in FIGS. 7, 8 and 9.

In the use of a fuel element assembly having spacer grids as shown in FIGS. 10 and 11, the fuel pins 24 are free to vibrate laterally in the spacer grids between limits defined by the clearance between the rigid dimples 26 and the back faces of the leaf members 25 which overlie the dimples 26. As in the arrangements of FIGS. 1-3 and FIGS. 4-6 the leaf members 25 remain in contact with the fuel pins 24 as the fuel pins 24 vibrate and tapping fretting occurs between the back faces of the leaf members 25 and the dimples 26.

In the forms of spacer grid shown in FIGS. 4-6 and FIGS. 10 and 11 the leaf members 14, 25 are integral with the strips 10, 22 forming the grid structures. However the leaf members 14, 25 may be formed as separate components to permit, for example, material different from the material of the leaf members 14, 25 to be used for the strips 10, 22 in the interests of neutron economy. In this case the separate leaf springs 14, 25 are attached to the strips 10, 22 of the grid structures by welding brazing or rivetting.

Figure 12:
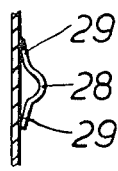
FIG. 12 is a detail of a modification applicable in the spacer grids of FIGS. 1–3, FIGS. 5–9 and FIGS. 10 and 11.

In all the forms of spacer grid disclosed above a semi resilient form of stop, as shown in FIG. 12, may be used in place of the rigid dimples. This stop comprises a curved centre bridge portion 28 having flat angled end parts 29 the stop being attached to the grid structure by welding at one of the parts 29. The leaf members of the spacer grids overlie these stops as they overlie the rigid dimples but the leaf members make contact with the curved centre portion 28 of the resilient stops in contrast to the clearance which is provided between the leaf members and the rigid stops in the forms of spacer grid described above.

In spacer grids using this form of semi-resilient stop lateral vibration of the fuel pins is permitted by flexing of the angled end parts 29 of the resilient stops. The limits of lateral vibration of the fuel pins are determined by flexion of the end parts 29 of the resilient stops into flat contact with the structural members of the spacer grid on which the semi resilient stops are supported, under which condition the semi resilient stops become substantially rigid to define the limit of lateral vibration of the fuel pins in the spacer grid.

Figure 13:
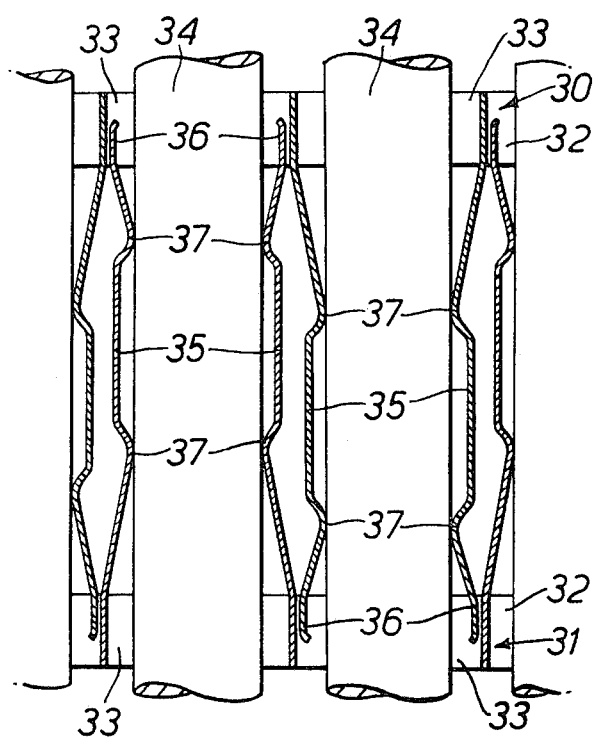
FIG. 13 is a longitudinal sectional elevation of a fourth form of spacer grid in accordance with the invention.

Finally FIG. 13 shows a further form of spacer grid comprising cojoined upper and lower egg box type grid structures 30 and 31. The grid structures 30 and 31 are formed from inter-locking strips 32 defining rectangular cells 33. The fuel pins 34 of a fuel assembly each pass through corresponding cells 33 in the upper and lower grid structures 30 and 31. In the upper grid structure 3 resilient leaf members 35 extend downwards from the lower edges of the strips 32 and in the lower grid structure 31 resilient leaf members 35 extend upwards from the upper edges of the strips 32.

Considering the left hand cell 33 in the lower grid structure 31 four leaf members 35 extend upwards from the edges of the cell 33 into the corresponding cell 33 in the upper grid structure 30. The leaf members 35 are bent inwards so that fretting surfaces 36 formed at their upper ends are spaced by a small clearance from the sides of the cell 33 in the upper grid structure 30. Each leaf member 35 has two longitudinally spaced dimples 37 which contact the corresponding fuel pin 34.

In the right hand cell 33 of the upper grid structure 30 four leaf members 35 extend downwards from the edges of the cell 33 into the corresponding cell 33 of the lower grid structure 31. The leaf members 35 are bent inwards so that fretting surfaces 36 formed at their lower ends are spaced by a small clearance from the sides of the cell 33 in the lower grid structure 31.

Each leaf member 35 also has two longitudinally spaced dimples 37 which contact the corresponding fuel pin 34.

The arrangement of upwardly extending leaf members 35 in the corresponding left hand pair of cells 33 in the upper and and lower grid structures 30 and 31 alternates throughout the spacer grid with the arrangement of downwardly extending leaf members 35 as shown in the corresponding right hand pair of cells 33 in the upper and lower grid structures 30 and 31 of FIG. 13.

In use of a fuel element assembly having spacer grids as shown in FIG. 13 of the fuel pins 34 are free to vibrate laterally in the spacer grids between limits defined by the clearance between the fretting surfaces 36 at the ends of the leaf members 35 and the sides of the cell 33 into which the ends of the leaf members 35 project.

In this case the leaf members 35 remain in contact with the fuel pins 34 as the fuel pins 34 vibrate and tapping fretting occurs between the fretting surfaces 36 at the ends of the leaf members 35 and the adjacent sides of the cells 33. However in this arrangement the leaf members 35 have some resilience after the fretting surfaces 36 contact the sides of the cells 33 and by this means fretting due to shock loading of the dimples 37 on the fuel pins 34 is avoided.

We claim:

1. A nuclear reactor fuel element assembly comprising a spacer grid, a plurality of elongated fuel pins supported in a bundle with their longitudinal axes parallel, the spacer grid comprising a grid structure of cellular form, the cells of the grid structure each being penetrated by a fuel pin of the fuel element assembly, stop means being defined in the cells of the grid structure for rigidly stopping lateral movement of the fuel pins at an outer limit point to limit outward movement of the fuel pins to said outer limit point, resilient leaf members extending longitudinally in the grid structure with respect to the fuel pin, the resilient leaf members of each cell being joined with the grid structure at their one ends and contacting the fuel pins which extend through the corresponding cells at contact points along their lengths spaced longitudinally from the joined ends, the side of each resilient leaf member opposite from that side contacting its corresponding fuel pin having a fretting part overlying the stop means and normally spaced from the outer limit point defined by its respective stop means, the resilient leaf members being sufficiently stiff so as to allow freedom of lateral floating of the fuel pins within the cells while remaining in contact with the fuel pins, the limits of lateral floating of the fuel pins within the cells of the grid structure being defined by points at which the fretting parts of the resilient leaf members are prevented from continuing to move laterally because of the rigidity of the said stop means at the said outer limit points which the fretting parts of the resilient leaf members engage at least at the limits of lateral floating of the fuel pins.

2. A nuclear reactor fuel element assembly as claimed in claim 1 wherein the grid structure comprises a plurality of cojoined tubular ferrules, a fuel pin extending through each ferrule, the ferrules being longitudinally slotted and shaped to define the resilient leaf members extending longitudinally inside the ferrules, the fuel pin extending through each ferrule being engaged by the free ends of the resilient leaf members in the ferrule, each ferrule being formed with outwardly extending rigid stop means, each corresponding to a resilient leaf member in an adjacent ferrule, the stop means extending to a point adjacent but spaced by a small clearance from the back faces of the ends of the resilient members which contact the fuel pins in the adjacent ferrules.

3. A nuclear reactor fuel element assembly as claimed in claim 2 wherein the resilient leaf members in each ferrule alternately extend in opposite longitudinal directions in the ferrule, the resilient leaf members in the ferrules each corresponding with a resilient leaf member extending in the opposite direction in an adjacent ferrule, said stop means extending outwardly from the ferrules at the bases of the resilient leaf members of the ferrules, the stop means at the base of each resilient member in the ferrules being associated with the oppositely extending corresponding resilient leaf member in an adjacent ferrule.

4. A nuclear reactor fuel element assembly as claimed in claim 1 wherein the grid structure comprises two longitudinally spaced grid members each formed from intersecting strips defining cells in the grid members, each fuel pin extending longitudinally through a pair of corresponding cells in the two grid members, resilient leaf members extending longitudinally from the edges of the cell in one of the grid members, the free ends of the resilient leaf members contacting the fuel pin within the corresponding cell in the second of the grid members, said ends of the resilient leaf members overlying but spaced by a small clearance from rigid stop means projecting inwardly from the faces of the cell in the second of the grid members.

5. A nuclear reactor fuel element assembly as claimed in claim 4 wherein a first set of resilient leaf members extends longitudinally from the edges of alternate cells in the one grid member, the free ends of the first set of resilient leaf members contacting the fuel pins and overlying the stop means in the corresponding cells of the second of the grid members and wherein a second set of resilient leaf members extends longitudinally from the edges of the other cells in the second of the grid members in the opposite direction to which the first set of resilient leaf members extends, the free ends of the second set of resilient leaf members contacting the fuel pins and overlying the stop means in the corresponding other cells of the first of the grid members.

6. A nuclear reactor fuel element assembly as claimed in claim 1 wherein the grid structure comprises three parallel grid members formed from rigid intersecting strips defining cells in each grid member, each fuel pin extending through three corresponding cells of the three grid members, a first set of resilient leaf members extending longitudinally from the edges of the cell of one of the outer grid members, the free ends of the first set of resilient leaf members contacting the fuel pin within the corresponding cell of the centre grid member, said ends of the first set of resilient leaf members overlying but spaced by a small clearance from stop means projecting inwardly from the faces of the cell of the centre grid member, a second set of resilient leaf members extending longitudinally from the edges of the cell of the centre grid member, the free ends of the second set of resilient leaf members contacting the fuel pin within the corresponding cell of the second of the outer grid members, the free ends of the second set of resilient leaf members overlying, but spaced by a small clearance from stop means projecting inwardly from the faces of the cell of said second outer grid member.

7. A nuclear reactor fuel element assembly as claimed in claim 1 wherein the grid structure comprises two longitudinally spaced grid members each formed from intersecting strips defining cells in the grid members, each fuel pin extending longitudinally through a pair of corresponding cells in the two grid members, resilient leaf members extending longitudinally from the edges of the cell in one of the grid members, the fuel pin being contacted by the resilient leaf members at a point intermediate the ends of the resilient leaf members, the free ends of the resilient leaf members facing but spaced by a small clearance from the faces of the corresponding cell in the second of the grid members.

8. A nuclear reactor fuel element assembly as claimed in claim 1 wherein the stop means are permanently of substantially rigid form.

9. A nuclear reactor fuel element assembly as claimed in claim 1 wherein the stop means are of semi resilient form and arranged so as to be initially flexible under load but so as to become substantially rigid under an optimum loading.

10. A nuclear reactor fuel element assembly as claimed in claim 9 wherein the stop means comprises stop members separately attached to the grid structure and comprising resilient strip material formed into a curved bridge part with flat angled end parts, the stop members being attached to the grid structure at the ends of the flat angled end parts which hold the bridge part of the stop members away from the grid structure.

* * * * *